July 29, 1941.  V. G. BULL  2,250,855

MOUNTING FOR ELECTRIC FITTINGS

Filed Dec. 5, 1940  2 Sheets-Sheet 1

Inventor
Victor G. Bull
By
Watson, Cole, Grindle & Watson
Attorneys

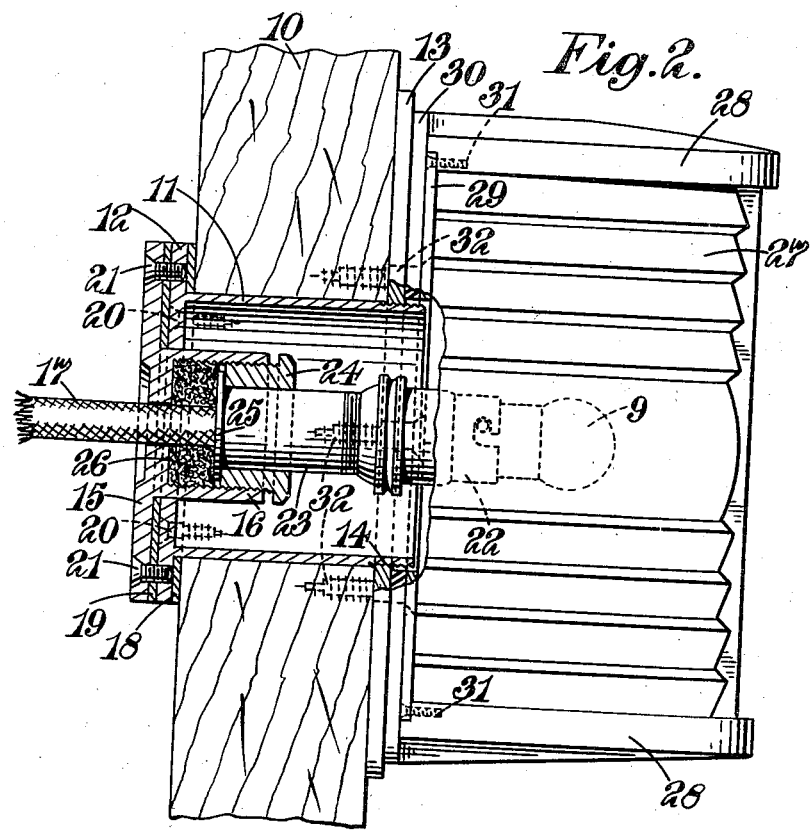

Patented July 29, 1941

2,250,855

UNITED STATES PATENT OFFICE 2,250,855

MOUNTING FOR ELECTRIC FITTINGS

Victor George Bull, Hythe, England, assignor to Hubert Scott-Paine, Hythe, Southampton, England Application December 5, 1940, Serial No. 368,715
In Great Britain November 21, 1939

1 Claim. (Cl. 240—11.3)

This invention is for improvements in or relating to mountings for electric fittings of the kinds arranged for attachment to a support which is accessible from both sides and particularly for electric light fittings. An object of the invention is to provide a mounting which hermetically seals the electric fitting, thereby rendering it airtight and watertight and also preventing an explosion being initiated should there be sparking produced in the fitting and when the fitting is used in an explosive atmosphere.

According to this invention, a mounting for an electric fitting of the kind referred to above comprises a metal tube arranged to extend through a hole in said support, a flange secured to each end of said tube, at least one of which flanges is detachable, means for clamping the two flanges on opposite sides of the support, a holder for the electric fitting having a backplate and a gland through which an electric supply cable may extend, means for clamping said backplate to one of said flanges, a casing enclosing said fitting, means for clamping said casing to the other flange and a sealing gasket arranged on either or each side of each flange. It will be appreciated that a mounting constructed in this manner is particularly suitable for lamp fittings which are to be used in ships and aircraft and which require to withstand drastic weather conditions and also for signal lamps and landing lights for aircraft. Similarly, the mounting is suitable for electric lights to be used in explosive atmospheres.

In the arrangement referred to above, that flange to which said backplate is attached may be formed integral with the metal tube and the other flange may be arranged in screw-threaded engagement with the tube.

The means for clamping the flanges to the support may comprise screws which extend through holes in the flanges and engage the support.

A sealing gasket may be arranged on each side of that flange which is attached to the backplate. Thus, a hermetic joint is formed between the backplate and the flange and between the flange and the support.

In the case of an electric light fitting, the frame which holds a cover glass may also be provided with a flange, and a sealing gasket is located between it and the adjacent flange of said tube.

The aforesaid screws may be arranged to extend through the two last-mentioned flanges and through the gasket, whereby said screws perform the dual function of securing the lamp casing to the support and forming a hermetic seal between said flanges.

The aforesaid gland may comprise a cup-shaped part formed on the inner face of the backplate and internally threaded to receive a hollow gland nut. The cable is arranged to extend into the cup-shaped part and is surrounded by suitable packing material which is compressed around the cable by said nut. The holder is provided with a part which extends through the hollow nut and is formed with a shoulder which is engaged by the inner end of said nut. That part of the holder which houses the securing terminals for the electric cable and the contacts for the electric fitting may be disposed within the aforesaid metal tube which thus prevents the emanation of harmful electrical radiation should sparking take place. The cable may be screened, for example, by metal braiding which may be arranged to extend through said gland and to be connected to a metal part of the fitting.

The aforesaid backplate is secured to the adjacent flange by metal setscrews. Thus, it is only necessary to release these screws to enable the lamp-holder to be withdrawn from the rest of the mounting which still remains hermetically sealed from the atmosphere on the opposite side of the support.

The following is a description of one embodiment of the invention as applied to a ship's navigation sidelights, reference being made to the accompanying drawings, in which:

Figure 2 is a view looking from the left of Figure 1 and showing certain parts of the construction in section.

Figure 1:
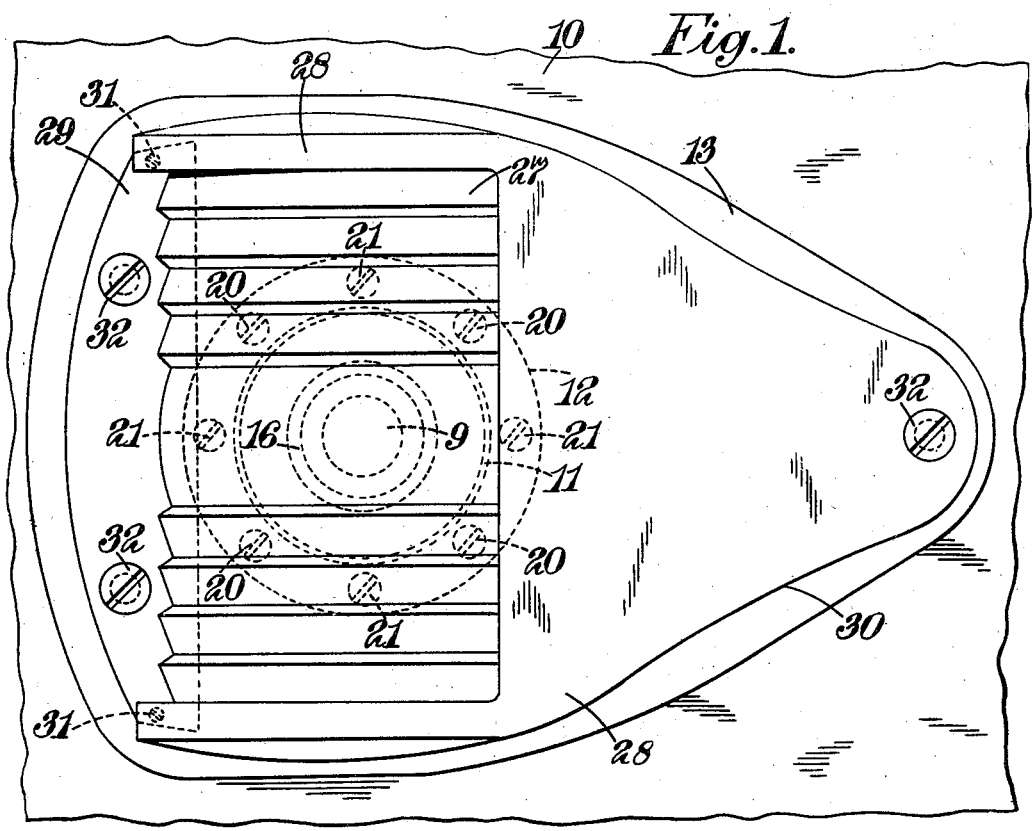
Figure 1 is a side elevation of the port sidelight.

In the construction illustrated, the support for the light is constituted by an upright portion 10 of the ship's structure, such as a side wall of a wheelhouse. The fitting is so arranged that, if necessary, the electric bulb 9 may be removed from within the wheelhouse. The wall is provided with an opening through which extends a tube 11. The tube is provided with two flanges 12 and 13 at opposite ends thereof, the flange 12 at the inner end being formed integral with the tube, whereas the flange 13 is detachably connected by means of screw-threads 14. Secured to the flange 12 is a backplate 15 which has a cup-shaped member 16 formed on the inner face thereof. The bottom of the cup-shaped member is provided with a hole through which an electric cable 17 can pass. A gasket 18 is arranged between the flange 12 and the support 10 and another gasket 19 is provided between the backplate and the flange. The flange 12 is secured to the support 10 by wood-screws 20 and the backplate 15 is secured to the flange by metal-screws 21.

The holder 22 for the electric bulb 9 is provided with a cylindrical extension 23 which projects into the cup-shaped member 16 and is retained therein by a hollow gland nut 24 which engages a shoulder 25 on said cylindrical extension and also engages a threaded part of the cup-shaped member. The cup-shaped member contains packing material 26 which is compressed by the gland nut and thus provides a leak-tight joint with the electric cable 17. It will be noted that the part of the holder which contains the terminals for the electric cable and the contacts for the lamp is disposed within the tube. The cable is surrounded by metal braiding which is electrically connected to a part of the holder. The electric lamp bulb is surrounded by a lamp glass 27 which is held in a lamp glass casing 28. The lamp glass casing is provided with a flange 29 arranged opposite the flange 13 and a gasket 30 is disposed between these two flanges. The flange is secured to the lamp glass casing by set-screws 31. The two flanges 13 and 29 are secured to the support 10 by wood-screws 32 which pass through holes in the flanges.

I claim:

An air-tight and water-tight mounting for an electric fitting adapted to be attached to a supporting wall, comprising a metal tube adapted to fit a hole in said wall, an outwardly and inwardly extending flange integral with said tube at one end, said outwardly extending portion of said flange being adapted to engage the inner side of said wall around said hole therein, means for securing the outwardly extending portion of said flange to said wall, a back-plate adapted to be secured to said flange and having an opening through the center thereof and provided on its inner face with an inwardly projecting cup-shaped portion which is internally threaded and on its outside engages said flange, a gland-nut adapted to screw into said cup-shaped portion of the back-plate, a lamp socket, a cable connected to said lamp socket and extending through the hole in said back-plate, said lamp socket having approximately the diameter of the hole in said gland-nut and being provided with a shoulder adapted to lie within said cup-shaped portion of said back-plate and be engaged by said gland-nut, packing material interposed between said shoulder on said lamp socket and the bottom of said cup-shaped portion on the backplate, an outwardly extending flange having screw-threaded engagement with the outside end of said tube and adapted to engage the outer side of said wall around the hole therein, a lamp glass and casing therefor adapted to abut said last-mentioned flange, and means for securing said lamp glass casing and the flange with which it cooperates to the outside of said supporting wall.

VICTOR GEORGE BULL.